United States Patent [19]

Eakin

[11] Patent Number: 4,884,949
[45] Date of Patent: * Dec. 5, 1989

[54] DRIVE UNITS FOR AIR DRIVEN VEHICLES

[76] Inventor: Robert R. Eakin, R.D.#2, Box 262, Franklin, Pa. 16323

[*] Notice: The portion of the term of this patent subsequent to May 5, 2004 has been disclaimed.

[21] Appl. No.: 273,596

[22] Filed: Jun. 15, 1981

Related U.S. Application Data

[63] Continuation-in-part of Ser. No. 73,743, Sep. 10, 1979, abandoned.

[51] Int. Cl.$^4$ ............................................. F01D 25/24
[52] U.S. Cl. ............................ 416/170 R; 416/244 R; 474/112; 474/146; 474/150; 403/287; 403/337
[58] Field of Search ........... 416/170 R, 204 R, 244 R; 474/112, 146, 150; 403/287, 336, 337; 440/37

[56] References Cited

U.S. PATENT DOCUMENTS

| | | | |
|---|---|---|---|
| 2,427,470 | 9/1947 | Morton et al. | 474/112 |
| 2,460,628 | 2/1949 | Fawick | 416/170 R |
| 2,477,447 | 7/1949 | Fawick | 403/337 X |
| 2,691,307 | 10/1954 | Pillsbury | 474/112 |
| 2,783,654 | 3/1957 | Carnell | 474/112 X |
| 2,978,208 | 4/1961 | Halsmer | 416/170 R X |
| 3,088,430 | 5/1963 | Champney | 474/150 X |
| 3,427,826 | 2/1969 | Anderson | 403/336 X |
| 4,121,532 | 10/1978 | Coryell, III | 403/337 X |
| 4,138,901 | 2/1979 | Fortin et al. | 416/170 R |

Primary Examiner—Frankie L. Stinson
Attorney, Agent, or Firm—Charles L. Lovercheck; Wayne L. Lovercheck

[57] ABSTRACT

A transmission for connecting a propeller to an engine having a crankshaft. The transmission has an output shaft and a propeller shaft and a belt connecting the output shaft to the propeller shaft. The output shaft has a pulley connectable to the crankshaft of an engine and a pulley driven propeller shaft is supported on the frame by means of a flange having bolt holes supported in a circle having a center offset from the center of the output shaft so that the flange can be connected to the frame in any position and bolted in place. The bolts can be removed and the flange rotated to different bolt holes thereby swinging the center of the propeller shaft around the center of the bolt holes to tighten the belt. An improved coupling is provided for connecting the drive pulley to the engine.

6 Claims, 2 Drawing Sheets

DRIVE UNITS FOR AIR DRIVEN VEHICLES

REFERENCE TO PRIOR APPLICATION

This application is a continuation in part of U.S. patent application Ser. No. 73,743 filed Sept. 10, 1979 and now abandoned.

OBJECTS OF THE INVENTION

It is an object of the invention to provide a transmission for connecting the propeller to an engine.

Another object of the invention is to provide a transmission that has a belt tightener that is simple in construction, economical to manufacture and simple and efficient to use.

Another object of the invention is to provide an improved transmission.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 4 is a longitudinal cross-sectional view of another embodiment of the invention.

FIG. 5 is a front view of the embodiment shown in FIG. 4.

DETAILED DESCRIPTION OF THE DRAWINGS

Figure 1:
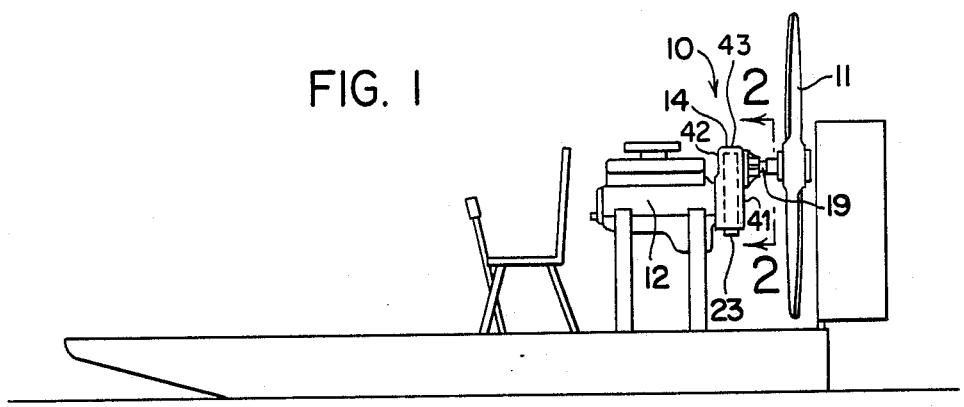
FIG. 1 is a side view of a boat having an engine and a transmission thereon according to the invention.

Now, with more particular reference to the drawings. The boat is shown having a seat, rudder and engine and is of the configuration well known to those skilled in the art. The engine is supported on the boat by a suitable engine mount and has the transmission 10 supported on it. The transmission supports a propeller 11 which is connected to the engine 12 by an output shaft 13. The transmission has a frame 14 and attaching means 15 for attaching the frame to the engine 12. The propeller shaft 19 is supported on the frame 14 having front 41, back 42, sides 43, 44 and top 45 integrally connected together forming a single piece of material, by means of the bearings. The attaching means 18 is used for attaching the first shaft 17 to the engine and the propeller shaft 19 is supported in the tubular member 24 which has the outwardly directed flange 25 with the bolts 36 connecting it to the frame 14.

The frame 14 has a back, front, sides and a half cylindrical shaped top as shown in the drawings. The flange 25 is only slightly smaller in diameter than the diameter of the half cylindrical top and is only slightly larger than the diameter of the opening which receives the tubular member 24 as shown so that the flange 25 may be attached to the frame adjacent the half cylindrical shaped top. All as shown in the drawings.

The drive pulley 21 is fixed to the flange 26 on the drive shaft 13 of the engine by means of the bolts 18. The distal end 29 of the shaft 17 is received in the bearings 31 which are supported in the flange member 30. The belt 23 connects the drive pulley 21 and the driven pulley 22 on propeller shaft 19 together for driving them. The bearings 32 are received in the tubular member 24 and they rotatably receive the propeller output shaft 19. The output shaft 19 has the flanged member 33 supported on its outer end and the propeller 11 is attached to the flange 33 by means of bolts 34.

The flange 30 is supported on the transmission frame 14 by means of the bolts 38 which extend through the holes in the flange 30 and threadably received holes in the transmission frame 14.

First bolt holes 35 are formed in the frame and a row of equally spaced bolt holes circular in pattern receive the bolts 36 clamping the flange 25 to the transmission frame 14. The center line 40 of the propeller shaft 19 is offset from the center 37 of the circle of bolts 36, so that when the bolts 36 are removed and the flange rotated to move each of the holes in the flange to a new hole, the center 40 will swing around the center 37 thereby tightening the belt.

In the embodiment of the invention shown in FIGS. 4 and 5, a coupling forming another connection for the first shaft 117 to crankshaft 113 is shown. The drive pulley 121 is fixed to flexible plate 140 by bolts 118 which have nuts 141 and heads 142 that rigidly fasten plate 140 to pulley 121. Attaching means includes bolts 143, spacers 145, flywheel 127 and flange 126 which flexibly attaches crank shaft 113) to drive pulley 121. Plate 140 is connected to flywheel 127 by bolts 143 which have nuts 144 and hold the spacers 145 between plate 140 and flywheel 127. Studs 146 extend through flywheel 127 and are threadably received in holes in flange 126 connecting flywheel 127 to flange 126 on crankshaft 113.

Plate 140 provides flexibility in misalignment between crankshaft 113 and shaft 117 which is fixed to pulley 121 and absorbs vibration. The outboard end 129 of shaft 117 is intended to be received in a bearing like the bearing 31 in the embodiment of the invention shown in FIGS. 1 through 3.

Figure 2:
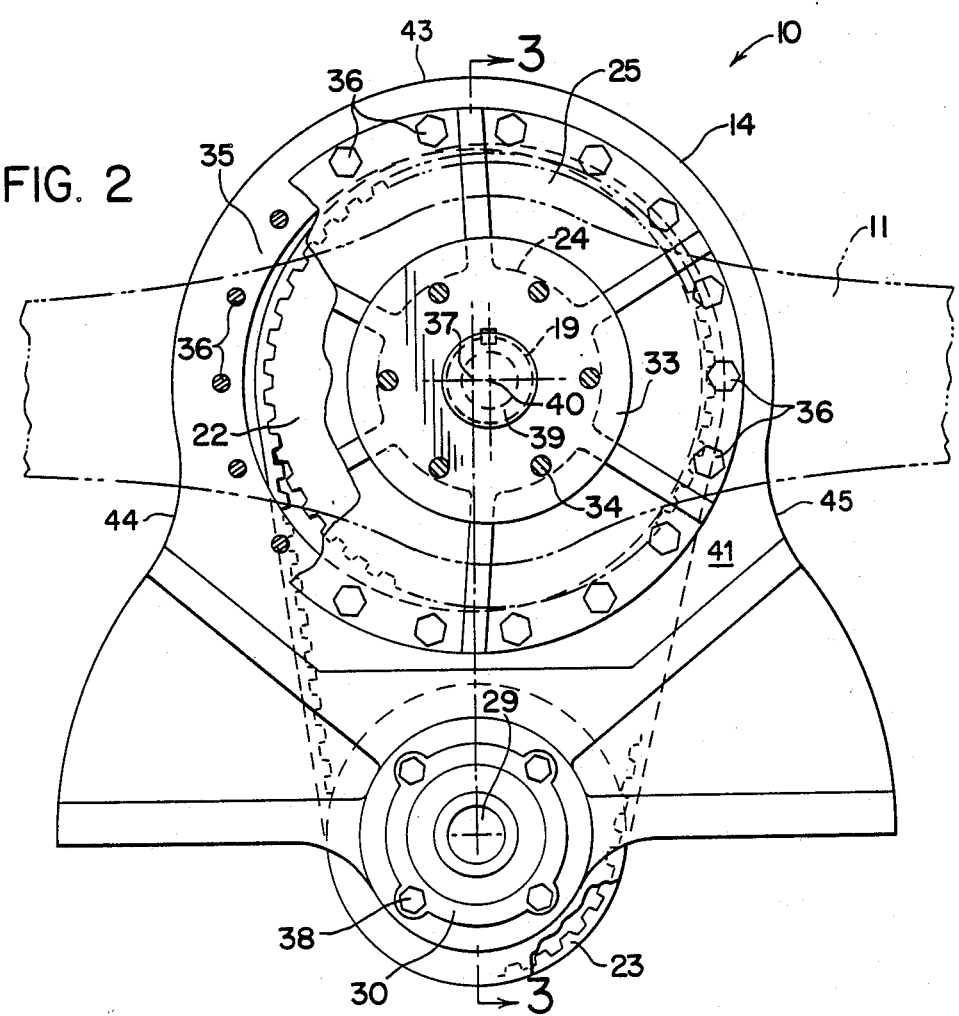
FIG. 2 is a rear view of a boat having the transmission mounted according to the invention.
Figure 3:
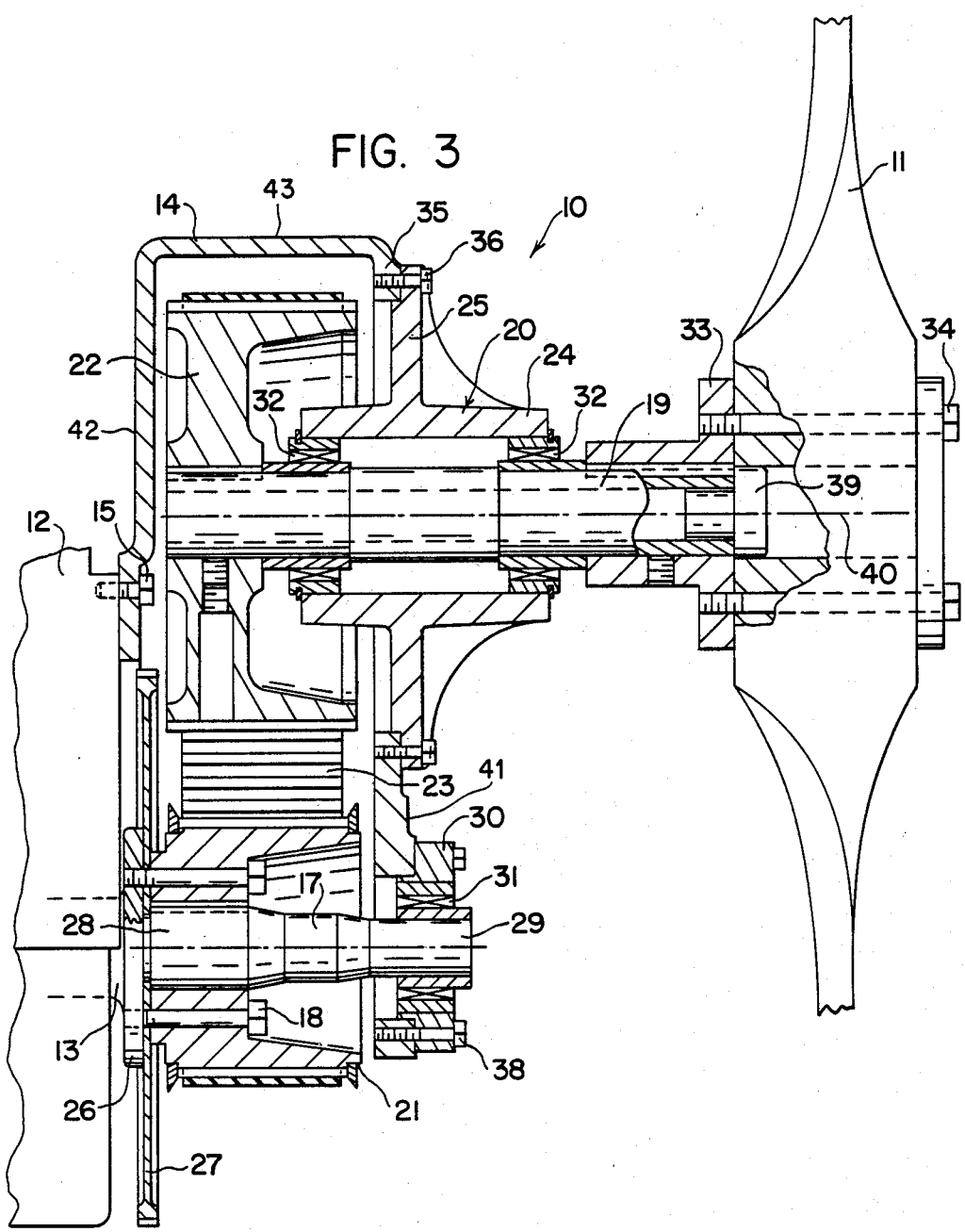
FIG. 3 is a longitudinal cross-sectional view of the transmission, bolted to engine.

In practice, a belt like belt 23 in the embodiment of FIGS. 1 through 3 will be supported on pulley 121.

Flexible plate 140 can be made of steel or any other sutable material. Flywheel 127 can be a conventional starter gear such as found on the usual automotive engine.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

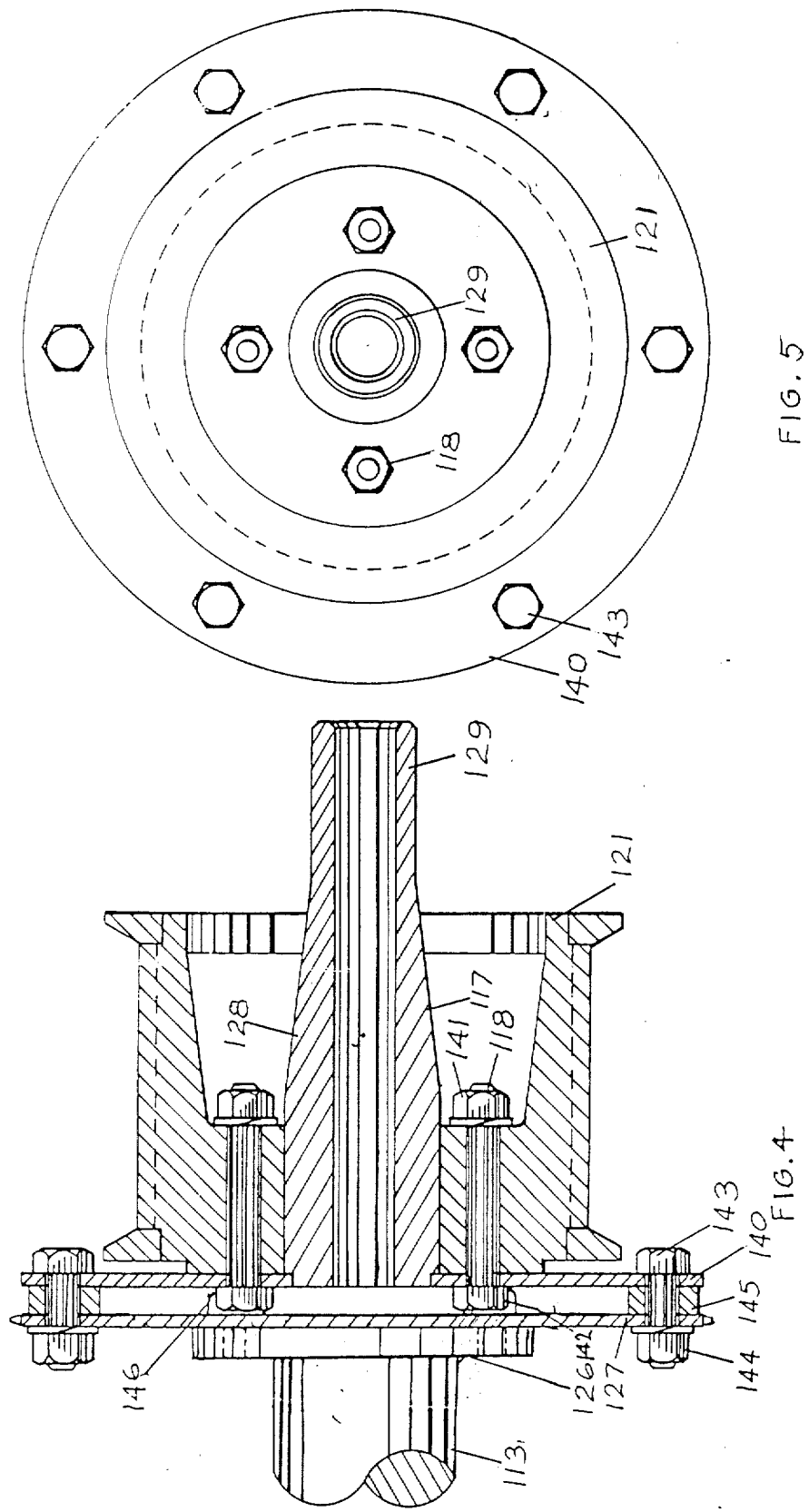

I claim:

1. A transmission for connecting a propeller (11) to an engine (12) having a crankshaft (13),
    a frame (14),
    said frame (14) having a front (41), a back (42), sides (43,44), and a top (45),
    said frame being generally half cylindrical in shape,
    said front (41), said back (42), said sides (43,44) and said top (45) being integrally connected together forming a single piece of material, first attaching means (15) attaching said frame (14) to said engine (12),
a propeller shaft (19),
said front (41) having an opening,
propeller shaft bearing means (20) extending through said opening and having a center line (40),
and second attaching means (36) attaching said propeller shaft bearing means (20) to said front (41) of said frame (14) adjacent said half cylindrical top (45),
drive pulley means (21),
a crank shaft (17),
third attaching means attaching said crank shaft (17) to said drive pulley means (21),
driven pulley means (22) on said propeller shaft (19),
said opening in said front of said frame being larger than said driven pulley means (22) thereby permitting said driven pulley means (22) to pass therethrough,
said propeller shaft bearing means (20) has a support having a radially outwardly directed circular flange (25),
said circular flange having substantially the same radius of curvature as said half cylindrical top (45),
said second attaching means (36) removably attaching the outer periphery of said circular flange (25) to said frame (14) around the outer periphery of said opening whereby said driven pulley means can be removed from said frame through said opening, and the shape of said frame adds strength to said frame to support said bearing means (20),
and belt means (23) connecting said drive pulley means (21) to said driven pulley means (22),
and bearing means fixed to said frame supporting an end of said crank shaft (17) remote from crankshaft on said frame.

2. The transmission recited in claim 1 wherein said bearing means (20) includes a tubular member (24) having a first end and a second end,
said propeller shaft (19) extends through said tubular member (24) and said propeller (11) is supported on said propeller shaft (19) at said first end of said tubular member and said driven pulley means (22) is supported on said propeller shaft (19) at said second end of said tubular member (24).

3. The transmission recited in claim 1 wherein said beaing means (20) includes an outwardly directed flange (25), a tubular member (24) receiving said propeller shaft and fixed to said circular flange (25),
said circular flange being fixed to said frame.

4. The transmission recited in claim 3 wherein a bearing (31) is supported in said circular flange receiving said first mentioned end of said drive shaft and spaced holes in said flange (30) clamping said flange to said frame.

5. The transmission recited in claim 1 wherein said propeller shaft bearing means has axially spaced bearings supported therein supporting said propeller shaft.

6. The transmission recited in claim 1 wherein said belt has spaced flat bottomed grooves therein and spaced ribs on said drive pulley and spaced ribs on said driven pulley received in said belt grooves.

* * * * *

UNITED STATES PATENT AND TRADEMARK OFFICE
CERTIFICATE OF CORRECTION

PATENT NO. : 4,884,949

DATED : December 5, 1989

INVENTOR(S) : Robert R. Eakin

It is certified that error appears in the above-identified patent and that said Letters Patent is hereby corrected as shown below:

The Drawing Sheet, consisting of FIGS. 4 and 5, should be added, as shown on the attached page.

Signed and Sealed this

Fourteenth Day of July, 1992

Attest:

DOUGLAS B. COMER

Attesting Officer

Acting Commissioner of Patents and Trademarks